P. J. ROACH AND D. CARTER.
METER FOR LIQUIDS.
APPLICATION FILED MAR. 3, 1919.
1,340,293.
Patented May 18, 1920.
3 SHEETS—SHEET 3.
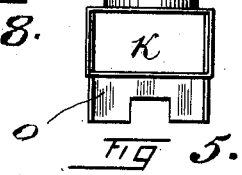
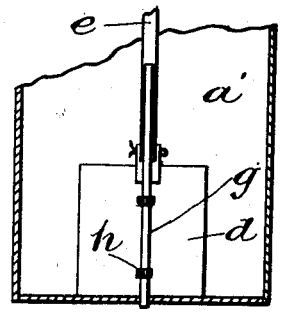
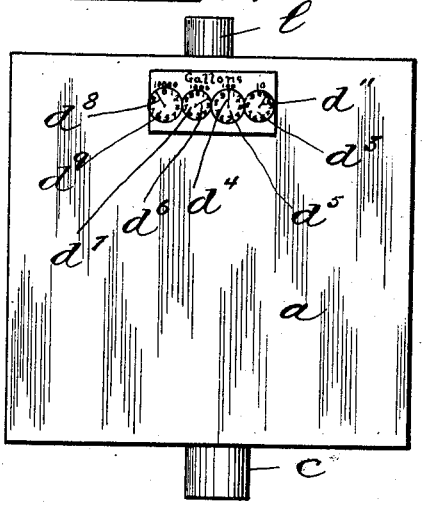
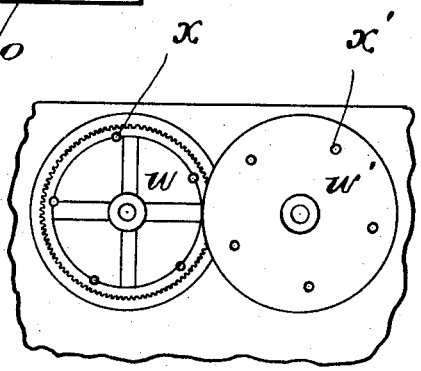

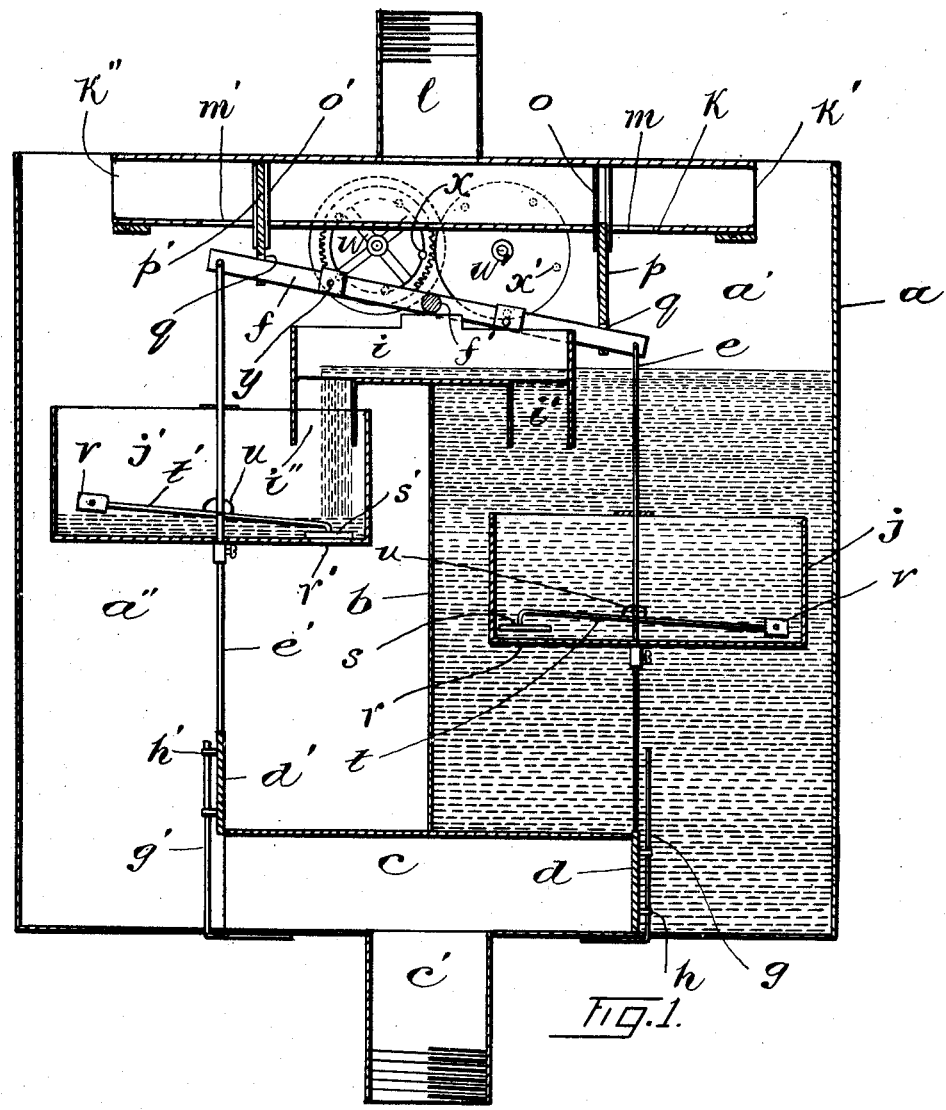

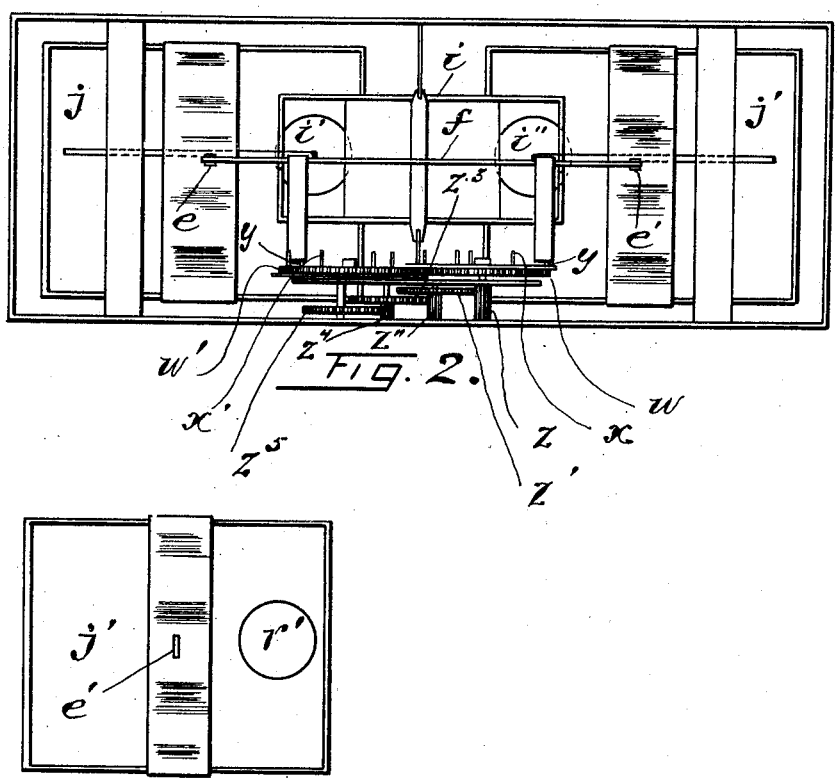

UNITED STATES PATENT OFFICE.

PATRICK JOSEPH ROACH AND DANIEL CARTER, OF TORONTO, ONTARIO, CANADA.

METER FOR LIQUIDS.

1,340,293.   Specification of Letters Patent.   Patented May 18, 1920.

Application filed March 3, 1919. Serial No. 280,324.

*To all whom it may concern:*

Be it known that we, PATRICK JOSEPH ROACH and DANIEL CARTER, British subjects, residing at the city of Toronto, in the county of York and Province of Ontario, Dominion of Canada, have invented certain new and useful Improvements in Meters for Liquids; and we hereby declare the following is a full, clear, and exact description of the same.

This invention relates to a meter for liquids, comprising a receptacle having two measuring compartments connected by an overflow through which the excess liquid of one compartment may enter the other, and outlets for the compartments controlled by means connected with a rocking beam actuated by the overflow from said compartments, to alternately open and close the outlets.

The invention further relates to a means for the actuation of the beam, consisting of a pan in each compartment, having a valve controlled orifice automatically closed during the inflow of the liquid into the compartment, and automatically opened to empty the pan during the outflow of the liquid from the compartment.

The invention further relates to a distributing trough having inlet orifices and to the control of these inlet orifices by means actuated by the rocking beam for the delivery of the liquid alternately to the compartments.

The invention further relates to a registering mechanism actuated by the beam, to indicate the quantity of the liquid which has passed through the meter.

For an understanding of the invention reference is to be had to the following description and to the accompanying drawings, in which:

Figure 1, is a vertical section of the meter,

Fig. 2, is a top plan view of the same,

Fig. 3, is a front elevation of the meter on a smaller scale than Fig. 1, showing the registering dials, Fig. 4, is an inverted plan view of the distributing trough, Fig. 5, is an end elevation of the same, Fig. 6, is an elevational view of one of the gates for the distributing trough, Fig. 7, is a fragmentary sectional elevation of one of the compartments, showing an outlet gate, Fig. 8, is an elevational view of the outlet gate, shown in Fig. 7, Fig. 9, is a plan view of one of the pans for actuating the rocking beam, and, Fig. 10, is an elevational view of the driving spur wheels for the registering mechanism.

Like characters of reference refer to like parts throughout the specification and drawings.

$a$ represents a receptacle, having two corresponding measuring compartments, $a'$, $a''$, separated by a vertical partition $b$, and $c$ represents an outlet manifold at the bottom of the receptacle, extending into each of the compartments $a'$, $a''$ and provided intermediate its ends with an outlet $c'$, through which the liquid content of each of the compartments is discharged.

The ends of the outlet manifold are open, as shown in Fig. 1, and opposed thereto are gates $d$, $d'$, in the compartments $a'$, $a''$, respectively, the gates $d$, $d'$, in their closed position engaging the ends of the outlet manifold and preventing the egress of the contents of their respective compartments until they have been opened for that purpose. Each of the gates $d$, $d'$, is connected by a rod $e$, $e'$, respectively, with the rocking beam $f$, which, as shown in Fig. 1, is mounted on a stud or shaft $f'$ above the top of the vertical partition $b$. To guide the movement of the gates $d$, $d'$, guide rods $g$, $g'$ are provided in the compartments $a'$, $a''$ respectively, in juxtaposition to the gates, and the gates are provided with eyes $h$, $h'$ respectively, encircling the guide rods and sliding thereon, the gates, during the operation of the rocking beam, being alternately moved to open and closed position, with relation to the ends of the outlet manifold.

Above the top of the partition $b$, but below the rocking beam $f$, is an overflow trough $i$, extending on both sides of the partition $b$ and, in the bottom of the overflow trough $i$, are orifices $i'$, $i''$, the orifice $i'$ being in the compartment $a'$, and the orifice $i''$ being in the compartment $a''$.

When the liquid in one compartment rises above the level of the bottom of the overflow trough, it flows through its respective orifice and the trough to the other orifice, by which it enters the other compartment.

Mounted upon the rods $e$, $e'$, are pans $j$, $j'$, respectively, of sufficient dimensions to overlap the orifices $i'$, $i''$, respectively, so that the excess liquid overflowing from one compartment to the other will be discharged into the pan therein, the discharge continuing until the pan is sufficiently filled to cause it to descend as hereinafter described.

When the pan is sufficiently filled, the weight of its liquid content causes it to descend and rock the beam $f$ on the stud or shaft $f'$ thereby lifting the other pan to its elevated position, as shown in the compartment $a''$ of Fig. 1. During the descent of a pan the beam $f$, lowers its respective gate to close the corresponding entrance of the outlet manifold, so that the egress of the liquid content of that compartment will be prevented until the pan has been lifted again to its elevated position.

At or near the top of the receptacle $a$ is a distributing trough $k$, having an inlet nipple $l$, through which the liquid enters, and having its ends $k'$, $k''$, open and located above the measuring compartments $a'$, $a''$, respectively.

In the bottom of the distributing trough $k$ are orifices $m$, $m'$, through which the inflowing liquid may enter the compartments $a'$, $a''$, and between the orifice $m$ and the inlet nipple $l$ is a set of guides $o$, and between the orifice $m'$ and the nipple is a second set of guides $o'$. Reciprocally movable in the guides $o$, $o'$, are gates $p$, $p'$, and in each of the gates $p$, $p'$, is a slot $q$ for the rocking beam $f$. The gate $p$ is located on one side of the stud or shaft $f'$, and the gate $p'$ is located on the other side, so that, during the rocking of the beam $f$, the gates will be moved to alternately open and close the passage to the orifices $m$, $m'$.

The operation of the above described parts of the meter is as follows:—

When the liquid is entering the compartment $a'$, the parts are in the position shown in Fig. 1, with the gate $p$ lowered to open the passage from the inlet nipple $l$ to the orifice $m$, and the gate $p'$ raised to close the passage from the inlet nipple $l$ to the orifice $m'$, so that the inflowing liquid will then enter the compartment $a'$. The liquid enters this compartment, and, when it has reached its predetermined level therein, it overflows by means of the trough $i$ and passes through the orifice $i''$ into the pan $j'$, which, at this time is elevated to the position shown in Fig. 1. When this pan is sufficiently filled with the overflow from the compartment $a'$, the weight of its contents overbalances the pan $j$, and the pan $j'$ then descends and lowers its respective end of the rocking beam $f$ which has the effect of closing the gate $d'$ against the end of the outlet manifold $c$ and lowering the gate $p'$ to open the passage from the inlet nipple $l$ to the orifice $m'$.

Simultaneously with this action, the beam $f$ raises the gate $p$ to close the passage from the inlet nipple $l$ to the orifice $m$ and to raise the gate $d$ above its respective end of the outlet manifold $c$, for the egress of the contents of the compartment $a'$ through the outlet manifold $c$ and outlet $c'$. The descending movement of the pan $j'$ rocks the beam $f$ and raises the pan $j$ to the elevation at which the pan $j'$ is shown in Fig. 1, the descent of the pan $j'$ continuing until it reaches the elevation at which the pan $j$ is shown in the same figure. The inflowing liquid then enters the compartment $a''$ and fills it to the level of the overflow, when the operation is again repeated with regard to the filling of the compartment $a'$ and the emptying of the compartment $a''$.

To provide for the discharge of the contents of the pans $j$, $j'$, the bottoms of these pans have orifices $r$, $r'$, through which their contents can escape, and, closing these orifices, are valves $s$, $s'$, provided with valve stems $t$, $t'$, respectively, pivoted intermediate their ends, as at $u$, the valve stems having counterbalances $v$ of slightly greater weight than the valves.

The operation of these valves is as follows:

The orifices $r$, $r'$ are vertically below the orifices $i'$, $i''$, respectively, and the liquid inflowing through the orifices $i'$, $i''$, descends upon the valves $s$, $s'$, and holds them in a closed position while the pan is in the elevated position shown by $j'$, in Fig. 1. This enables the pan to fill and when it becomes full, or partly so, it overbalances the weight of the pan in the filled compartment and descends to its lowered position in the unfilled compartment, the valve controlling the orifice of this pan remaining closed until the liquid flowing into this compartment has risen above the level of the valve. The counterbalance $v$ then lifts the valve from its seat so that the contents of the pan may flow into the compartment as it empties, the valve being maintained away from its seat until the pan has again risen to its elevated position and the overflow from the other compartment commences, when it is again closed as above stated.

Journaled within the receptacle $a$, are two driving spur wheels $w$, $w'$, provided with pins $x$, $x'$, engaging with corresponding pins $y$, $y'$, on the beam $f$.

The teeth of the spur wheels $w$, $w'$, intermesh and the pins $y$, $y'$, on the beam are so positioned that each descent of the beam causes either the pin $y$ to engage with a pin $x$, or the pin $y'$ to engage with a pin $x'$ and cause the corresponding rotation of both the driving spur wheels $w$, $w'$, thereby intermittently driving the spurwheel $w$.

On the shaft of the driving spurwheel $w$, is a pinion $z$, with which meshes the spur wheel $z'$, and on the shaft of the spur wheel $z'$ is a pinion $z''$, with which meshes the spur wheel $z^3$, and on the shaft of the spur wheel $z^3$ is a pinion $z^4$, with which meshes the spur wheel $z^5$. The spur wheel $w$ is provided with a pointer $d''$ for the unit dial $d^3$, the shaft of the spur wheel $z'$ is provided with a pointer $d^4$ for the "tens" dial $d^5$, the shaft of the spur wheel $z^3$ is provided with a pointer $d^6$ for the "hundreds" dial $d^7$, and the spur wheel $z^5$ is provided with a pointer $d^8$ for the "thousands" dial $d^9$.

As no claim is made in regard to the feature of the registering device, further than its being operated by the rocking beam, it will be unnecessary to enter into any detailed description of its construction and operation, otherwise than to say that the intermittent rotation of the "unit" spurwheel $w$ imparts a corresponding rotation to the remaining spurwheels.

Having thus fully described our invention, what we claim as new and desire to secure by Letters Patent is:

1. A meter for liquids comprising two measuring compartments arranged to overflow into each other, a rocking beam, a pan within each compartment connected with the beam and adapted to receive the overflow from the other of said compartments and to overflow into its respective compartment, an outlet for each of said compartments, and controlling means rigidly connected to and moving unitedly with each pan for positively and instantaneously closing the outlet of one compartment before the liquid overflows into said compartment from the pan thereof.

2. A meter for liquids comprising two measuring compartments arranged to overflow into each other, a rocking beam, a pan within each compartment connected with the beam and adapted to receive the overflow of the other of said compartments, an outlet for each of said compartments, means controlling said outlets rigidly connected to and moving unitedly with each pan for positively and instantaneously closing the outlet of one compartment before the liquid overflows into said compartment from the pan thereof, and a distributing trough having inlet orifices for said compartments alternately opened and closed by the rocking of the beam.

3. A meter for liquids comprising two measuring compartments arranged to overflow into each other, a rocking beam, a pan within each compartment connected with the beam and adapted to receive the overflow from the other of said compartments and to overflow into its respective compartment, an outlet for each of said compartments, and controlling means rigidly connected to and moving unitedly with each pan for positively and instantaneously closing the outlet of one compartment before the liquid overflows into said compartment from the pan thereof, each of said pans having a discharge orifice and a valve for closing said orifice automatically opened when the pan has overflowed into its respective compartment.

4. A meter for liquids comprising two measuring compartments arranged to overflow into each other, a rocking beam, a pan within each compartment connected with the beam and adapted to receive the overflow from the other of said compartments and to overflow into its respective compartment, an outlet for each of said compartments, controlling means rigidly connected to and moving unitedly with each pan for positively and instantaneously closing the outlet of one compartment before the liquid overflows into said compartment from the pan thereof, and registering means actuated by the beam.

5. A meter for liquids comprising a receptacle containing two measuring compartments connected by an overflow by which the excess liquid of one compartment may enter the other, an outlet for each compartment, a gate for each outlet, a rocking beam connected with the gates to alternately open and close said outlet, a pan in each measuring compartment connected with the beam and adapted to receive the overflow of the other compartment, an outlet orifice in the bottom of each pan, a rocking valve to close the orifice and a counterbalance for the valve to automatically open it.

6. A meter for liquids comprising a receptacle containing two measuring compartments connected by an overflow by which the excess liquid of one compartment may enter the other, an outlet for each compartment, a gate for each outlet, a rocking beam connected with the gates to alternately open and close said outlets, a pan in each measuring compartment connected with the beam and adapted to receive the overflow of the other compartment, an outlet orifice in the bottom of each pan, a rocking valve to close the orifice, a counterbalance for the valve to automatically open it, a distributing trough having an orifice above each compartment, and means actuated by the beam alternately opening and closing said orifices.

7. A meter for liquids comprising two measuring compartments adapted to overflow into each other, means for admitting liquid thereto, outlets for the compartments, a rocking beam, a pan within each compartment connected with the beam and adapted to receive the overflow from the other of said compartments and to overflow into its respective compartment, controlling means rigidly connected to and moving unitedly with each pan for positively and instantaneously closing the outlet of one compartment before the liquid overflows into said compartment from the pan thereof, and registering means actuated by the beam.

8. A meter for liquids comprising a receptacle containing two measuring compartments connected by an overflow by which the excess liquid of one compartment may enter the other, an outlet at the bottom of each compartment, a gate in each compartment controlling its respective outlet, a rocking beam, rods connecting the gates with the rocking beam, a pan mounted upon each of said rods to receive the overflow from the other compartment, said pan when filled causing the descent of its respective rod and gate and rocking the beam to lift the other rod and pan and gate to their elevated position, an inlet trough above the compartments having inlet orifices above said pans and gates connected with the rocking beam and actuated thereby to control the inlet of the liquid to said compartment.

Toronto, February 22, 1919.

PATRICK JOSEPH ROACH.
DANIEL CARTER.

Signed in the presence of—
   CHAS. H. RICHES.